(12) United States Patent
Patsis

(10) Patent No.: US 9,161,110 B1
(45) Date of Patent: Oct. 13, 2015

(54) LOUDSPEAKER MOUNT

(71) Applicant: Speaqua, Inc., Deer Park, NY (US)

(72) Inventor: Steven G. Patsis, Deer Park, NY (US)

(73) Assignee: Speaqua Corp., Deer Park, NY (US)

( * ) Notice: Subject to any disclaimer, the term of this patent is extended or adjusted under 35 U.S.C. 154(b) by 0 days.

(21) Appl. No.: 14/491,154

(22) Filed: Sep. 19, 2014

(51) Int. Cl.
*H04R 1/02* (2006.01)
*B62J 3/00* (2006.01)

(52) U.S. Cl.
CPC ... *H04R 1/02* (2013.01); *B62J 3/00* (2013.01); *H04R 1/026* (2013.01); *H04R 2201/021* (2013.01); *H04R 2499/13* (2013.01)

(58) Field of Classification Search
CPC .......... H04R 1/02; H04R 1/025; H04R 1/026; H04R 1/08; H04R 5/02; H04R 2205/026; H04R 2499/15; H04R 2201/021; H04R 2201/025; H04R 2499/13; F16M 11/04; F16M 11/14
USPC ............. 381/86, 87, 332, 334, 336, 386, 387, 381/388, 389, 395, 390; 181/150, 199; 248/127, 176.1, 177.1, 187.1, 181.1
See application file for complete search history.

(56) References Cited

U.S. PATENT DOCUMENTS

| | | | |
|---|---|---|---|
| 4,765,580 A * | 8/1988 | Wright ...................... 248/181.1 |
| 6,480,613 B1 * | 11/2002 | Choi ............................ 381/386 |
| 6,877,731 B1 | 4/2005 | Corley, Sr. |
| 8,014,656 B2 | 9/2011 | Woodman |
| 8,150,248 B1 | 4/2012 | Woodman |
| 8,196,272 B2 | 6/2012 | Curtis |
| 8,559,666 B2 * | 10/2013 | Shibata ......................... 381/395 |
| 2005/0100187 A1 * | 5/2005 | Yang ............................ 381/386 |

OTHER PUBLICATIONS

Accessorize your GoPro, GoPro—Surfboard Mounts, http://shop.gopro.com/mounts/surfboard-mounts/ASURF-001.html, pp. 1-7, Apr. 3, 2015.

* cited by examiner

*Primary Examiner* — Huyen D Le
(74) *Attorney, Agent, or Firm* — Carter, DeLuca, Farrell & Schmidt, LLP

(57) ABSTRACT

A loudspeaker mount includes a coupling member and a platform attached to the coupling member. The platform includes a wall defining a planar face configured for disposal of a loudspeaker. The coupling member may be clamped to a handle bar of a bicycle.

22 Claims, 5 Drawing Sheets

LOUDSPEAKER MOUNT

BACKGROUND

While traveling between locations, for example, by riding a bicycle, it may be dangerous to employ headphones as a means to listen to music or other sounds, as headphones make it difficult for a user to hear a warning signal, for example, a car horn. An additional drawback to using headphones is that they make it difficult to carry on a conversation with others and make for an isolated listening experience that cannot be shared with friends or family.

Portable loudspeakers make up for the above-noted deficiencies of headphones. Portable loudspeakers, for example, Bluetooth-enabled, portable loudspeakers are suitable for use during travel due to their portability, size, quality of sound produced, and ability to be used without access to a power source. However, a drawback of portable loudspeakers is that they require a surface to rest on or to be attached to in order to be effectively used. Holding a portable loudspeaker while riding a bicycle is a dangerous endeavor and placing the portable loudspeaker in one's pocket will muffle the sound.

Accordingly, there is a need for a way to use a portable loudspeaker while using a human-powered vehicle, for example, a bicycle.

SUMMARY

In one aspect of the present disclosure, a loudspeaker mount is provided. The loudspeaker mount includes a coupling member and a platform. The platform includes a wall and a pivotable member. Wall defines a planar face configured for disposal of a loudspeaker. The pivotable member extends from the planar wall and is pivotably coupled to the coupling member.

In some embodiments, the coupling member may define a cylindrical passageway therethrough configured for receipt of a bar of a human-powered, pedal-driven, single-track vehicle. In some embodiments, the human-powered, pedal-driven, single-track vehicle may be a bicycle and the bar may be a handle bar of the bicycle.

It is contemplated that the coupling member may include a first arm and a second arm rotatably coupled to the first arm. The first and second arms may be rotatable relative to one another between an open configuration and a closed configuration. The first arm may have an arcuate inner surface and the second arm may have an arcuate inner surface in opposed relation to the inner surface of the first arm. In the closed configuration, the inner surfaces of the first and second arms together define a cylindrical passageway.

In some embodiments, the first and second arms may each include a lining disposed on the inner surfaces thereof. The lining may be configured to frictionally engage a bar of a human-powered, pedal-driven, single-track vehicle. It is envisioned that the lining may be fabricated from rubber.

In some embodiments, the coupling member may further include a locking mechanism including a shaft and a shroud. The shaft may have a first end disposable in the first arm and a second end having a threaded portion disposable in the second arm. The shroud may be rotatably connectable to the threaded portion of the shaft such that rotation of the shroud moves the first and second arms between the open and closed configurations.

It is contemplated that the coupling member may include a tube extending from the first arm. The pivotable member may be pivotably disposed within the tube.

In some embodiments, the loudspeaker mount may further include a collar threadedly connectable to the tube of the coupling member to prevent the pivotable member from exiting the tube. The tube may have a longitudinal slit partially extending therethrough such that an opening of the tube is expandable. The collar may be configured to fix a diameter of the opening. The collar may include a tapered inner surface threadedly engaged to an outer surface of the tube such that rotation of the collar expands or collapses the opening of the tube. The slit may extend through a threaded portion of the outer surface of the tube.

In another aspect of the present disclosure, a loudspeaker mount for a bicycle is provided. The loudspeaker mount includes a coupling member, a platform, a locking mechanism, and a collar. The coupling member includes a first arm and a second arm. The first and second arms each have an arcuate inner surface. The first and second arms are rotatable relative to one another between an open configuration and a closed configuration, in which the inner surfaces are configured to capture a handle bar of a bicycle. The locking mechanism includes a shaft and a shroud. The shaft has a first end disposable in the first arm and a second end having a threaded portion disposable in the second arm. The shroud is rotatably connectable to the threaded portion of the shaft such that rotation of the shroud moves the first and second arms between the open and closed configurations. The coupling member further includes a tube extending upwardly from the first arm. The platform includes a wall and a pivotable member. The wall defines a planar face configured for disposal of a loudspeaker. The pivotable member extends from the planar wall and is pivotably disposed within the tube of the first arm of the coupling member. The collar is threadedly connectable to the tube of the coupling member to prevent the pivotable member from exiting the tube.

Further details, advantages, and aspects of exemplary embodiments of the present disclosure are described in more detail below with reference to the appended figures.

As used herein, the terms parallel and perpendicular are understood to include relative configurations that are substantially parallel and substantially perpendicular up to about + or −10 degrees from true parallel and true perpendicular.

BRIEF DESCRIPTION OF THE DRAWINGS

Embodiments of the present disclosure are described herein with reference to the accompanying drawings, wherein.

DETAILED DESCRIPTION

Figure 1:
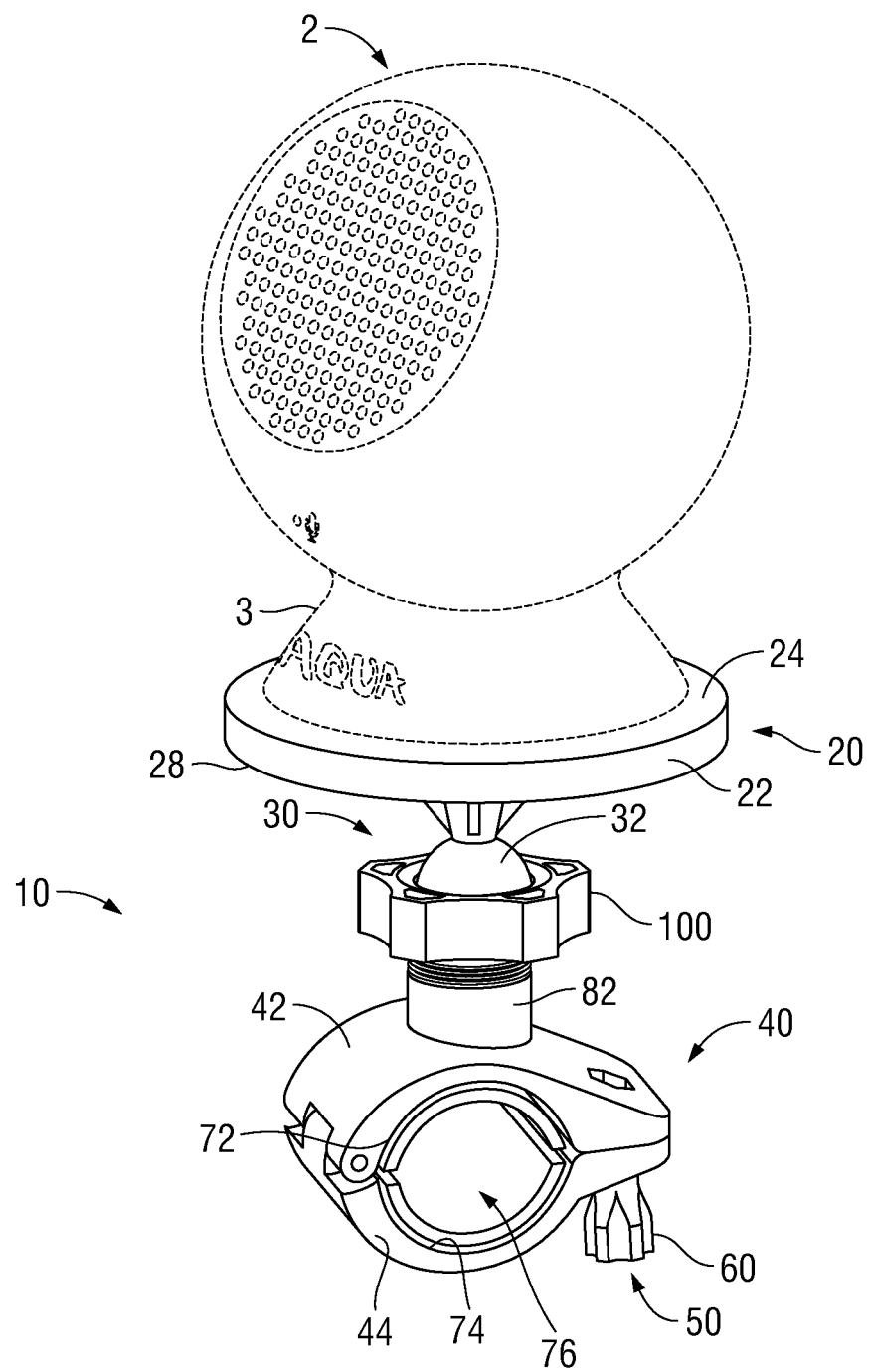
FIG. 1 is a perspective view of a loudspeaker mount and a portable speaker mounted thereto.

Embodiments of the presently disclosed loudspeaker mounts are described in detail with reference to the drawings, in which like reference numerals designate identical or corresponding elements in each of the several views.

Figure 2:
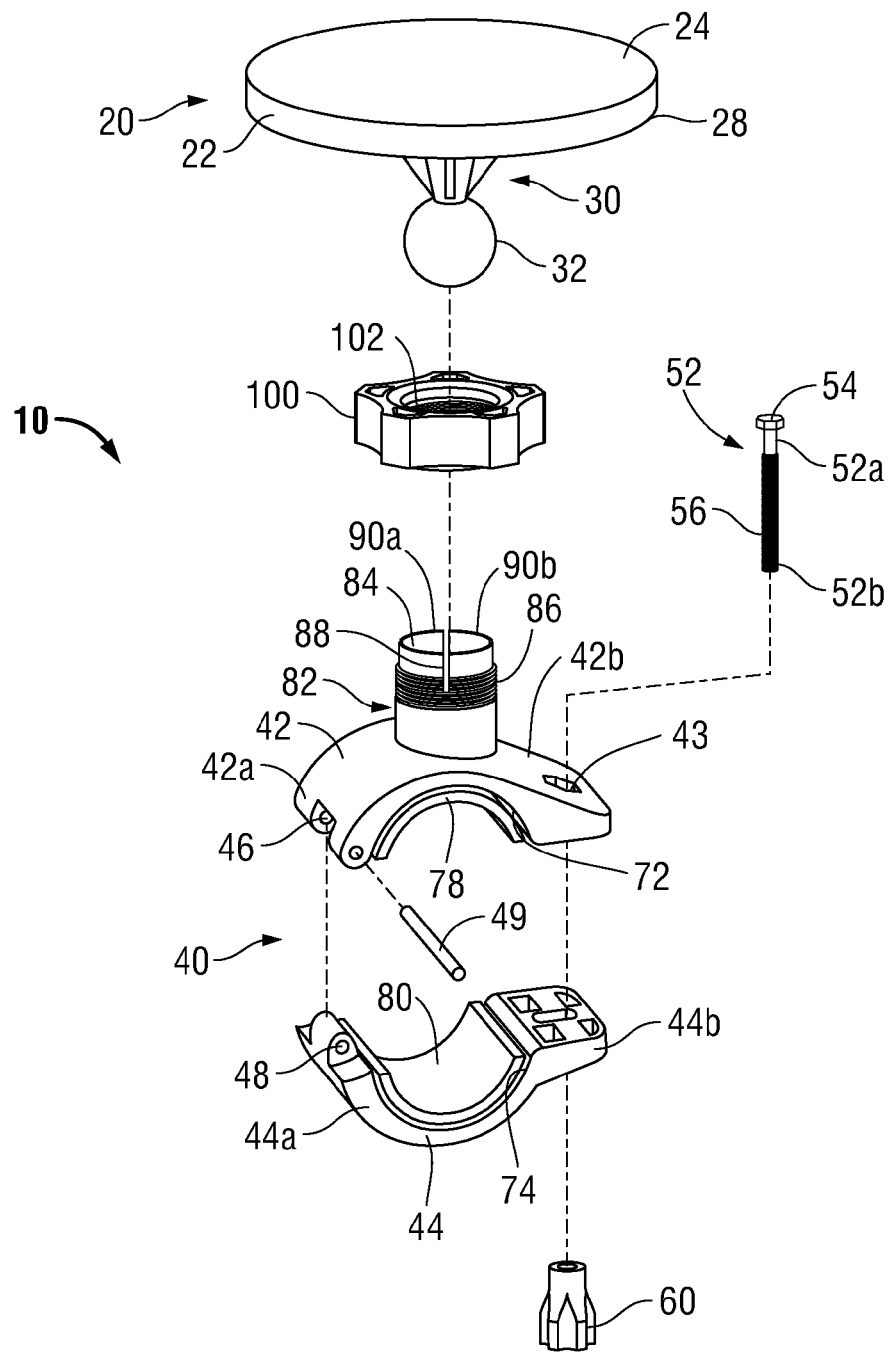
FIG. 2 is an exploded view of the loudspeaker mount of FIG. 1.

Referring initially to FIGS. 1 and 2, illustrated is a loudspeaker mount 10 configured to mount a loudspeaker, for example, a Bluetooth-enabled, mini, portable loudspeaker 2 to a human-powered, pedal-driven, single-track vehicle, such as, for example, a handle bar of a bicycle (not shown). It is contemplated that loudspeaker mount 10 may be configured to couple to various surfaces, such as, for example, other components of various single-track vehicles. In some embodiments, loudspeaker mount 10 may be configured to support or connect to various types of loudspeakers.

Loudspeaker mount 10 generally includes a platform 20 and a coupling member 40 pivotably coupled to platform 20. Platform 20 is configured to connect to and/or support thereon a loudspeaker, e.g., loudspeaker 2. Coupling member 40, which may be in the form of a c-clamp, is configured to be connected to a handle bar of a bicycle. Platform 20 includes a wall 22 having a disc-shaped configuration. Wall 22 defines a planar face 24 configured to support a loudspeaker thereon, for example, a suction cup 3 of loudspeaker 2. In some embodiments, wall 22 is variously configured, such as, for example, curved, rectangular, uniform, non-uniform, tapered, undulating, convex, concave, cylindrical, and/or polygonal.

Platform 20 includes a pivotable member 30 extending perpendicularly from an underside 28 of wall 22. Pivotable member 30 has a joint 32, such as, for example, a ball joint configured to pivotably connect to coupling member 40 in a ball and socket connection, as described in greater detail below. In some embodiments, pivotable member 30 may be connected to coupling member 40 via various fastening arrangements to permit articulation of platform 20, such as, for example, a pivot joint, a saddle joint, or a hinge joint.

Figure 3A:
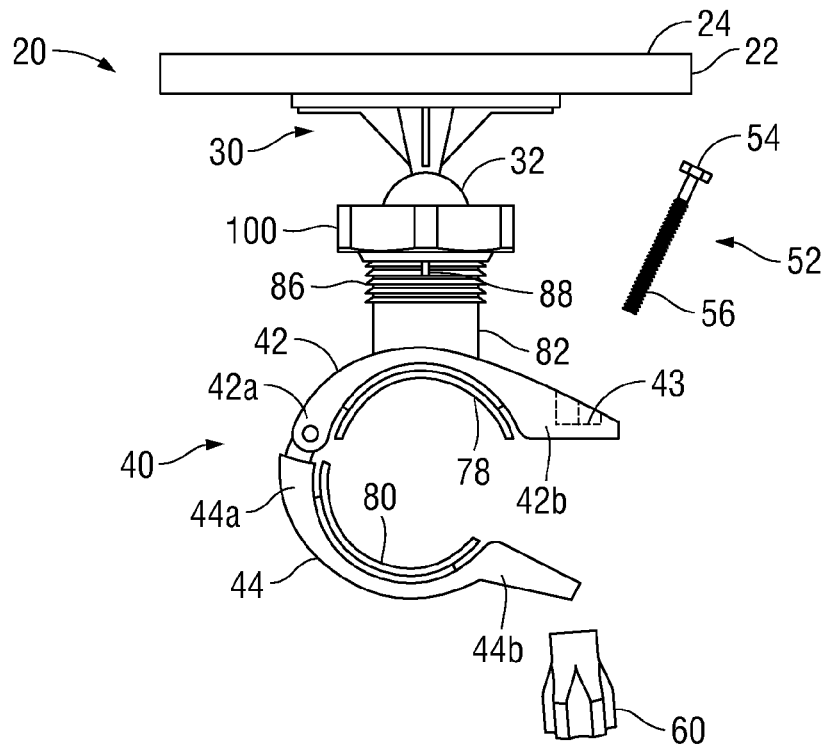
FIG. 3A is a side view of the loudspeaker mount of FIG. 1 in an open configuration.

With continued reference to FIGS. 1 and 2, coupling member 40 includes a first arm 42 and a second arm 44 rotatably coupled to one another. First and second arms 42, 44 each include a first end 42a, 44a and a second end 42b, 44b. First ends 42a, 44a of respective arms 42, 44 include bores 46, 48 having a pivot pin 49 disposed therein such that first and second arms 42, 44 are rotatable relative to one another between an open configuration, as shown in FIG. 3A, and a closed configuration, as shown in FIG. 3C.

Figure 3B:
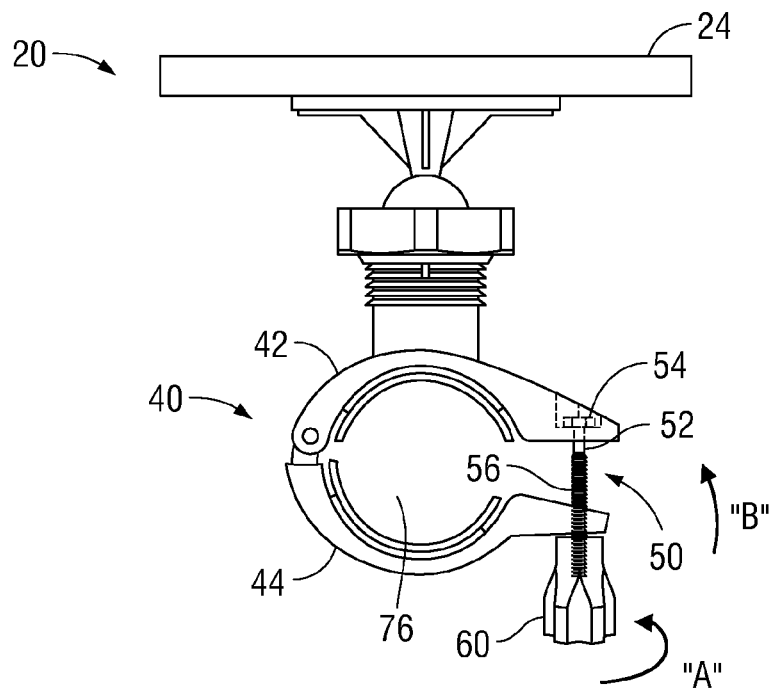
FIG. 3B is a side view of the loudspeaker mount of FIG. 1 in a partially open configuration.
Figure 3C:
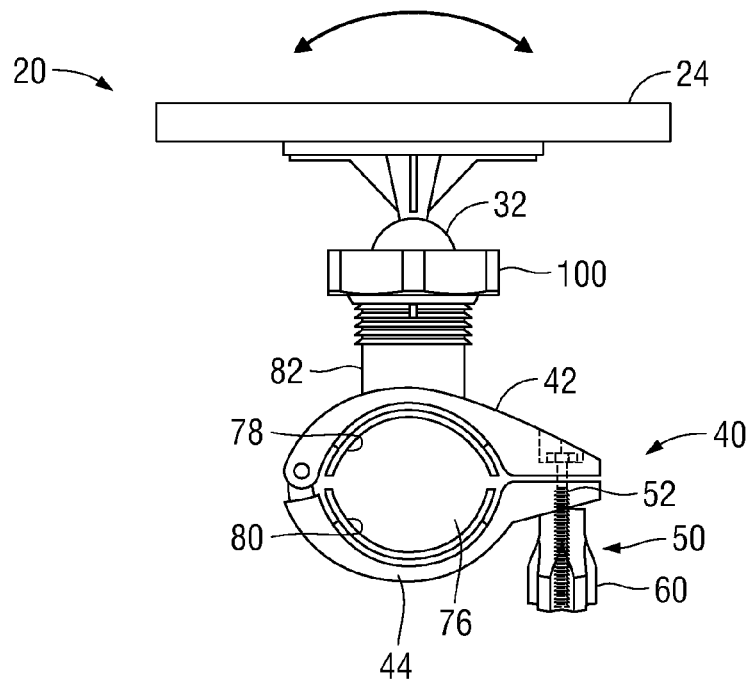
FIG. 3C is a side view of the loudspeaker mount of FIG. 1 in a closed configuration.

With reference to FIGS. 1, 2, 3A, and 3B, coupling member 40 includes a locking mechanism 50 configured to maintain coupling member 40 in the closed configuration. Locking mechanism 50 includes a shaft 52 and a shroud, such as, for example, a nut 60. Shaft 52 has a first end 52a and a second end 52b. First end 52a of shaft 52 has a head 54 disposable in second end 42b of first arm 42, as shown in FIG. 3B. In some embodiments, head 54 of shaft 52 is non-rotatably fixed in a counterbore 43 defined in second end 42b of first arm 42. In some embodiments, head 54 of shaft 52 is removably received in second end 42b of first arm 42. Second end 52b of shaft 52 has a threaded portion 56. Threaded portion 56 is translatably disposable in second end 44b of second arm 44 such that second arm 44 can traverse the length of shaft 52 as coupling member 40 transitions between the open and closed configurations.

Nut 60 is rotatably coupled to threaded portion 56 of shaft 52 and in abutment with an outer surface of second end 44b of second arm 44, as shown in FIG. 3B. Upon rotation of nut 60, in the direction indicated by arrow "A" in FIG. 3B, nut 60 travels toward head 54 of shaft 52 and, in turn, rotates second arm 44 relative to first arm 42, in the direction indicated by arrow "B" in FIG. 3B, via the abutting engagement between nut 60 and second end 44b of second arm 44. As such, coupling member 40 may be selectively fixed in the closed configuration shown in FIG. 3C.

First and second arms 42, 44 of coupling member 40 each include an inner surface 72, 74 having an arcuate configuration. Inner surfaces 72, 74 are in opposed relation to one another and together define a cylindrical passageway 76 configured for disposal of a bar, for example, a handle bar of a bicycle (not shown). In the closed configuration, as shown in FIG. 3C, inner surfaces 72, 74 are configured to capture a handle bar of a bicycle therebetween.

First and second arms 42, 44 each include a lining 78, 80 disposed on inner surfaces 72, 74 thereof. Lining 78, 80 may be in the form of an insert, a coating, or may be monolithically formed with inner surfaces 72, 74 of first and second arms 43, 44. Lining 78, 80 is fabricated from a material configured to improve the ability of coupling member 40 to capture a structure between arms 42, 44. For example, lining 78, 80 is fabricated from a rubber to enhance the frictional engagement between coupling member 40 and a handle bar of a bicycle.

Coupling member 40 includes a tube 82 extending perpendicularly from an outer surface of first arm 42. In some embodiments, tube 82 may extend at various angles relative to the outer surface of first arm 42, such as, for example, at acute or obtuse angles. Tube 82 has an opening 84 configured for pivotable receipt of joint 32 of platform 20. Tube 82 has a threaded outer surface 86 and a longitudinal slit 88 partially extending through tube 82 and through threaded outer surface 86 of tube 82. Longitudinal slit 88 partially divides tube 82 into two half-sections 90a, 90b that can expand away from one another or collapse toward one another to increase or decrease a diameter of opening 84 of tube 82, as described in greater detail below.

Figure 3D:
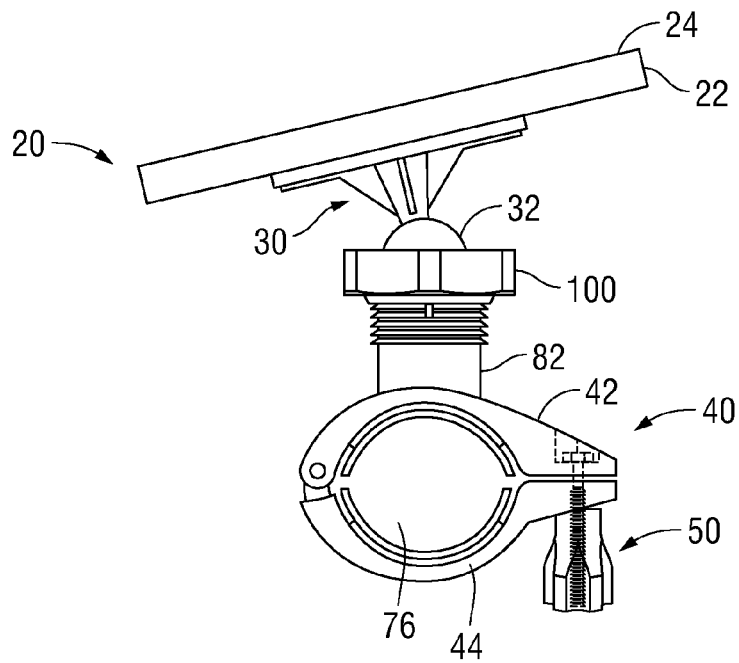
FIG. 3D is a side view of the loudspeaker mount of FIG. 3C illustrating a platform thereof in a tilted condition.

Loudspeaker mount 10 further includes a collar 100 threadedly connectable to threaded outer surface 86 of tube 82 to fix the diameter of opening 84 of tube 82. As such, collar 100, upon connection with threaded outer surface 86 of tube 82, prevents half-sections 90a, 90b of tube 82 from expanding away from one another to prevent joint 32 of platform 20 from exiting tube 82. Collar 100 includes a tapered, threaded inner surface 102 (FIG. 2) threadedly engageable to threaded outer surface 86 of tube 82. As collar 100 travels down threaded outer surface 86 of tube 82, via rotation of collar 100, the taper of inner surface 102 of collar 100 causes half-sections 90a, 90b of tube 82 to expand away from one another or collapse toward one another and, in turn, increases or decreases the diameter of opening 84 of tube 82. As such, to fix platform 20 in a selected position relative to coupling member 40, for example, the tilted position shown in FIG. 3D, collar 100 is moved downward along tube 82, via rotation of collar 100, tightening the frictional engagement between tube 82 of coupling member 40 and joint 32 of platform 20.

In operation, a portable loudspeaker is selected for use, such as, for example, loudspeaker 2 (FIG. 1). With coupling member 40 in the open configuration shown in FIG. 3A, loudspeaker mount 10 is engaged to a structure, for example, a handle bar of a bicycle, by disposing the handle bar between arms 42, 44 of coupling member 40. To fix or lock loudspeaker mount 10 to the handle bar, nut 60 is rotated, in the direction indicated by arrow "A" in FIG. 3B, capturing the handle bar in passageway 76. Loudspeaker mount 10 is resisted and/or prevented from sliding relative to the handle bar due to the frictional engagement between lining 78, 80 and the handle bar.

Loudspeaker 2 may be positioned on planar face 24 of platform 20 via suction cup 3 or any other frictional engagement. Platform 20 may be moved to a selected orientation relative to the handle bar, for example, the tilted orientation shown in FIG. 3D. Upon achieving the selected orientation, collar 100 may be rotated to lock platform 20 in the selected orientation. A user may then ride the bicycle while listening to the sounds emitted from loudspeaker 2 trusting that loudspeaker 2 will remain coupled to the bicycle.

Figure 4A:
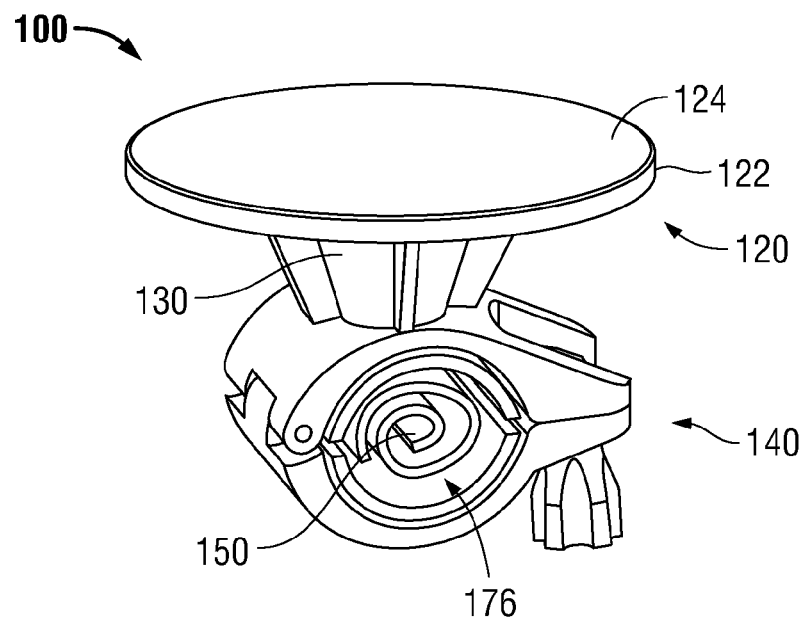
FIG. 4A is a perspective view of an embodiment of a loudspeaker mount in accordance with the principles of the present disclosure.
Figure 4B:
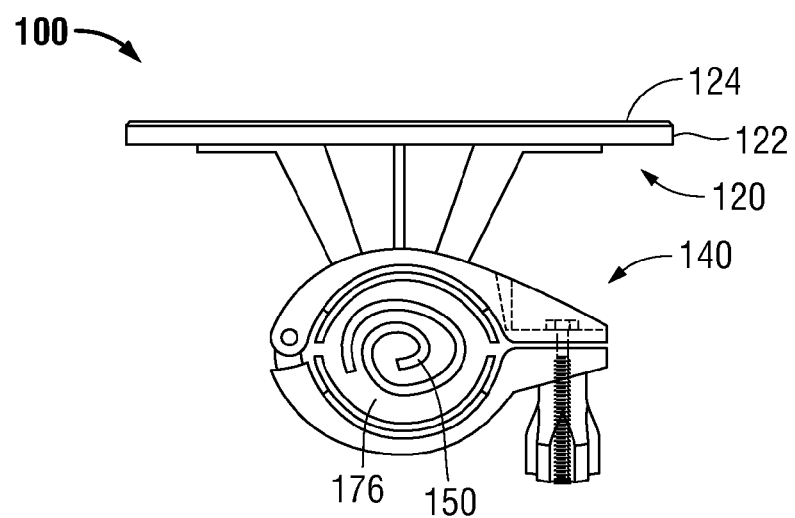
FIG. 4B is a side view of the loudspeaker mount of FIG. 4A.

In one embodiment, as shown in FIGS. 4A and 4B, a loudspeaker mount 100, similar to loudspeaker mount 10, is provided. Loudspeaker mount 100 includes a platform 120 and a coupling member 140, similar to coupling member 40. Platform 120 includes a wall 122, similar to wall 22. Wall 22 defines a planar face 124 configured to support a loudspeaker thereon, for example, a suction cup 3 of loudspeaker 2 (FIG. 1). Platform 120 further includes a neck 130 that fixedly interconnects wall 122 with coupling member 140 such that wall 122 does not move relative to coupling member 140. Neck 130 projects substantially perpendicularly from wall 122 such that planar face 124 extends parallel to a longitudinal axis defined through a cylindrical passageway 176 of coupling member 140.

Coupling member 140, like coupling member 40 described above, is configured to be mounted to a surface, for example, a handle bar of a bicycle, a towel rack, a neck of a shower head, a railing, etc, to couple the selected surface to platform 120. Loudspeaker mount 100 further includes a spiral member 150 disposable within cylindrical passageway 176 of coupling member 140. Spiral member 150 may be fabricated from a pliable material, such as, for example, rubber. In some embodiments, spiral member 150 may be a separate component of loudspeaker mount 100 or may be integrally formed with coupling member 140. Spiral member 150 is configured to coil around a bar (e.g., a handle bar of a bicycle) to reduce a diameter of cylindrical passageway 176 and, in turn, increase the friction fit between coupling member 140 and the handle bar of a bicycle. It is contemplated that spiral member 150 may also be used with loudspeaker mount 10.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

What is claimed is:

1. A loudspeaker mount, comprising:
   a coupling member; and
   a platform coupled to the coupling member, wherein the platform includes a wall defining a planar face configured for disposal of a loudspeaker,
   wherein the coupling member includes:
   a first arm; and
   a second arm rotatably coupled to the first arm, wherein the first and second arms are rotatable relative to one another between an open configuration and a closed configuration, and
   wherein the first arm has an arcuate inner surface and the second arm has an arcuate inner surface in opposed relation to the inner surface of the first arm, in the closed configuration, the inner surfaces of the first and second arms together define a cylindrical passageway.

2. The loudspeaker mount according to claim 1, wherein the platform further includes a pivotable member extending from the wall and pivotably coupled to the coupling member.

3. The loudspeaker mount according to claim 2, wherein the coupling member includes a tube, the pivotable member pivotably disposed within the tube.

4. The loudspeaker mount according to claim 3, further comprising a collar threadedly connectable to the tube of the coupling member to prevent the pivotable member from exiting the tube.

5. The loudspeaker mount according to claim 4, wherein the tube has a longitudinal slit partially extending therethrough such that an opening of the tube is expandable, the collar configured to fix a diameter of the opening.

6. The loudspeaker mount according to claim 5, wherein the collar includes a tapered inner surface threadedly engaged to an outer surface of the tube such that rotation of the collar expands or collapses the opening of the tube.

7. The loudspeaker mount according to claim 6, wherein the slit extends through a threaded portion of the outer surface of the tube.

8. The loudspeaker mount according to claim 1, wherein the cylindrical passageway is configured for receipt of a bar of a human-powered, pedal-driven, single-track vehicle.

9. The loudspeaker mount according to claim 8, wherein the human-powered, pedal-driven, single-track vehicle is a bicycle and the bar is a handle bar of the bicycle.

10. The loudspeaker mount according to claim 8, further comprising a spiral member disposable within the cylindrical passageway of the coupling member and configured to coil around the bar.

11. The loudspeaker mount according to claim 1, wherein the first and second arms each include a lining disposed on the inner surfaces thereof.

12. The loudspeaker mount according to claim 11, wherein the lining is fabricated from rubber.

13. The loudspeaker mount according to claim 1, wherein coupling member further includes a locking mechanism including:
   a shaft having a first end disposable in the first arm and a second end having a threaded portion disposable in the second arm; and
   a shroud rotatably connectable to the threaded portion of the shaft such that rotation of the shroud moves the first and second arms between the open and closed configurations.

14. The loudspeaker mount according to claim 1, wherein the platform further includes a neck fixedly interconnecting the wall of the platform and the coupling member.

15. A loudspeaker mount for a bicycle, comprising:
   a coupling member including:
      a first arm having an arcuate inner surface;
      a second arm having an arcuate inner surface, the first and second arms rotatable relative to one another between an open configuration and a closed configuration, in which the inner surfaces are configured to capture a handle bar of a bicycle;
      a locking mechanism including:
         a shaft having a first end disposable in the first arm and a second end having a threaded portion disposable in the second arm; and
         a shroud rotatably connectable to the threaded portion of the shaft such that rotation of the shroud moves the first and second arms between the open and closed configurations; and
      a tube extending upwardly from the first arm;
   a platform including:
      a wall defining a planar face configured for disposal of a loudspeaker; and
      a pivotable member extending from the planar wall and pivotably disposed within the tube of the first arm of the coupling member; and a collar threadedly connectable to the tube of the coupling member to prevent the pivotable member from exiting the tube.

16. A loudspeaker mount, comprising:
a coupling member; and
a platform coupled to the coupling member, wherein the platform includes a wall defining a planar face configured for disposal of a loudspeaker,
wherein the coupling member includes:
a first arm; and
a second arm coupled to the first arm, wherein the first and second arms are movable relative to one another between an open configuration and a closed configuration, and
wherein the first arm has an inner surface and the second arm has an inner surface in opposed relation to the inner surface of the first arm, in the closed configuration, the inner surfaces of the first and second arms together define a passageway.

17. The loudspeaker mount according to claim 16, wherein the platform further includes a pivotable member extending from the wall and pivotably coupled to the coupling member.

18. The loudspeaker mount according to claim 17, wherein the coupling member includes a tube, the pivotable member pivotably disposed within the tube.

19. The loudspeaker mount according to claim 18, further comprising a collar threadedly connectable to the tube of the coupling member to prevent the pivotable member from exiting the tube.

20. The loudspeaker mount according to claim 19, wherein the tube has a longitudinal slit partially extending therethrough such that an opening of the tube is expandable, the collar configured to fix a diameter of the opening.

21. The loudspeaker mount according to claim 16, wherein coupling member further includes a locking mechanism including:
a shaft having a first end disposable in the first arm and a second end having a threaded portion disposable in the second arm; and
a shroud rotatably connectable to the threaded portion of the shaft such that rotation of the shroud moves the first and second arms between the open and closed configurations.

22. The loudspeaker mount according to claim 16, wherein the platform further includes a neck fixedly interconnecting the wall of the platform and the coupling member.

* * * * *